Aug. 25, 1925.

W. F. KASPER 1,551,158

FRAME FOR RAILWAY MOTOR CARS

Filed Jan. 31, 1922     3 Sheets-Sheet 1

INVENTOR
WALTER F. KASPER
ATTORNEYS

Aug. 25, 1925.  
W. F. KASPER  
1,551,158  
FRAME FOR RAILWAY MOTOR CARS  
Filed Jan. 31, 1922  3 Sheets-Sheet 3
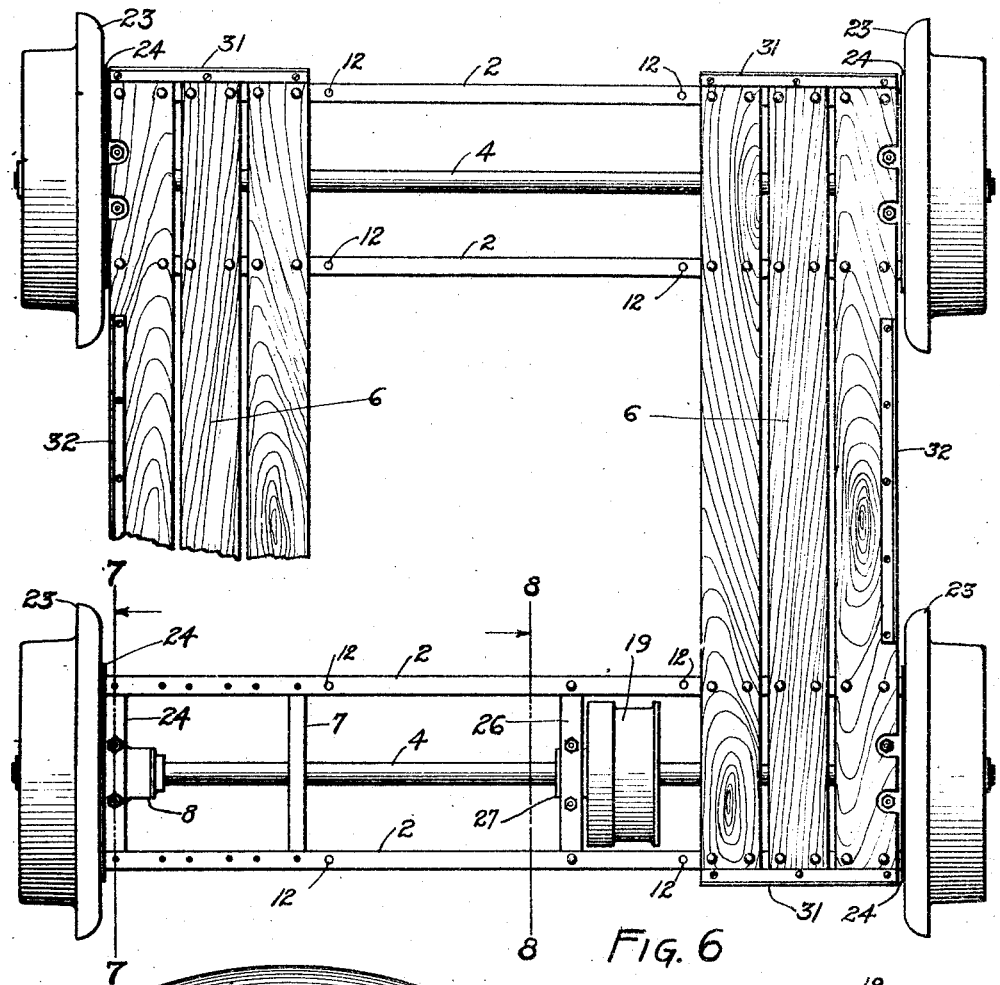
FIG. 6
FIG. 8
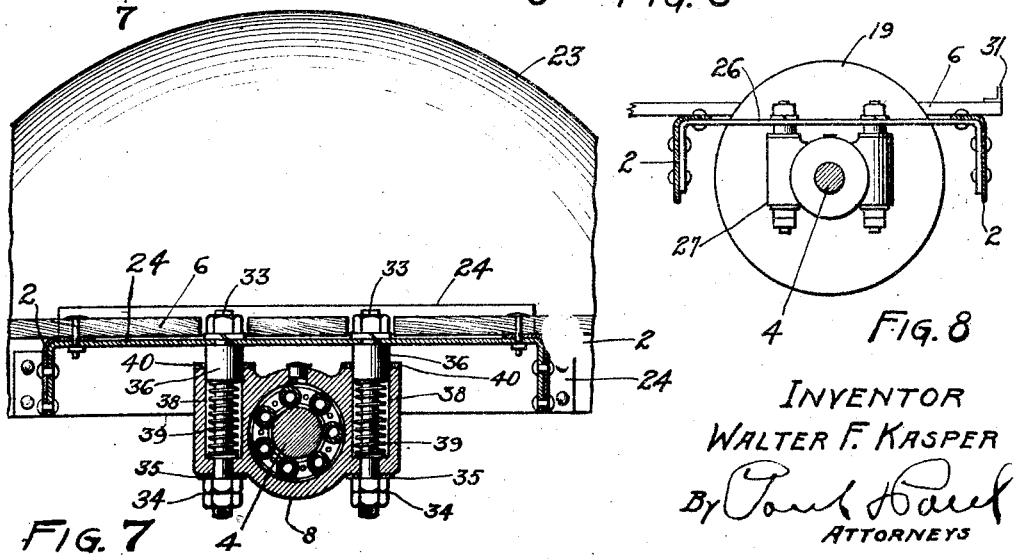
FIG. 7
INVENTOR  
WALTER F. KASPER  
By  
ATTORNEYS Patented Aug. 25, 1925.

1,551,158

UNITED STATES PATENT OFFICE.

WALTER F. KASPER, OF FAIRMONT, MINNESOTA, ASSIGNOR TO FAIRMONT GAS ENGINE & RAILWAY MOTOR CAR CO., OF FAIRMONT, MINNESOTA, A CORPORATION OF MINNESOTA.

FRAME FOR RAILWAY MOTOR CARS.

Application filed January 31, 1922. Serial No. 532,993.

*To all whom it may concern:*

Be it known that I, WALTER F. KASPER, a citizen of the United States, resident of Fairmont, county of Martin, State of Minnesota, have invented certain new and useful Improvements in Frames for Railway Motor Cars, of which the following is a specification.

The object of my invention is to provide a frame for a motor car of comparatively light construction which can be easily and quickly moved to and from the track and put on or off by one man, and may also be easily and quickly taken apart for handling purposes or shipping from place to place. Generally cars of this type have frames in one piece, with motive power secured therein and are so heavy that considerable labor and time is involved in moving the car to or from the track or loading it into a baggage or other car for shipment. My invention eliminates all this difficulty as one man can easily handle the car and if he desires he can easily separate the car into sections and provision is made for lifting the power plant frame and handling it separately from the truck frame.

A further object is to provide a spring mounting for the car by which vertical motion will be permitted and the axle always held in proper alignment with respect to the car frame.

Other objects of the invention will appear from the following detailed description.

The invention consists generally in various constructions and combinations, all as hereinafter described and particularly pointed out in the claims.

Figure 1:
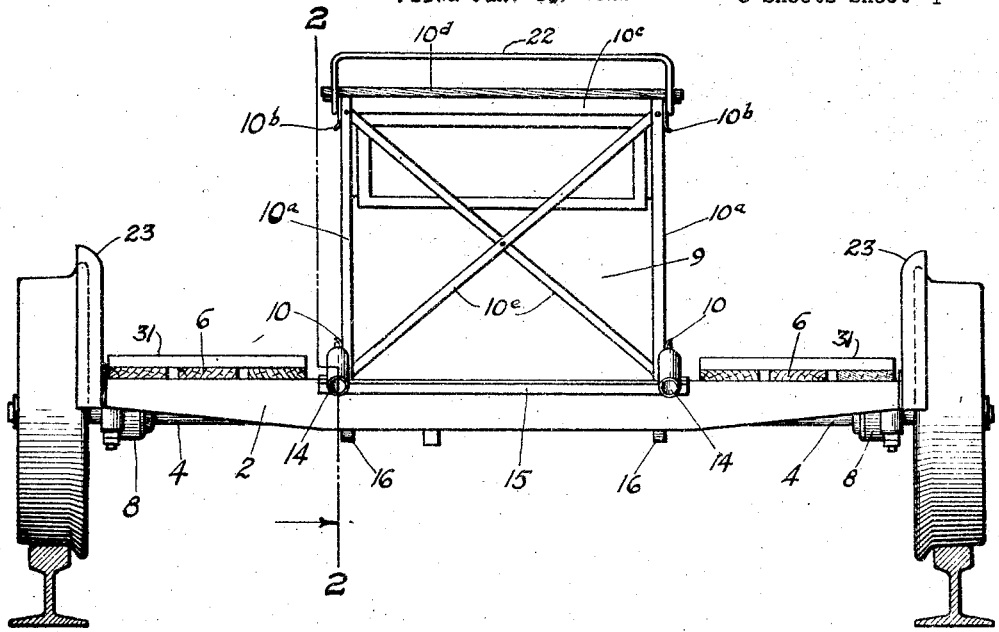
Figure 2:
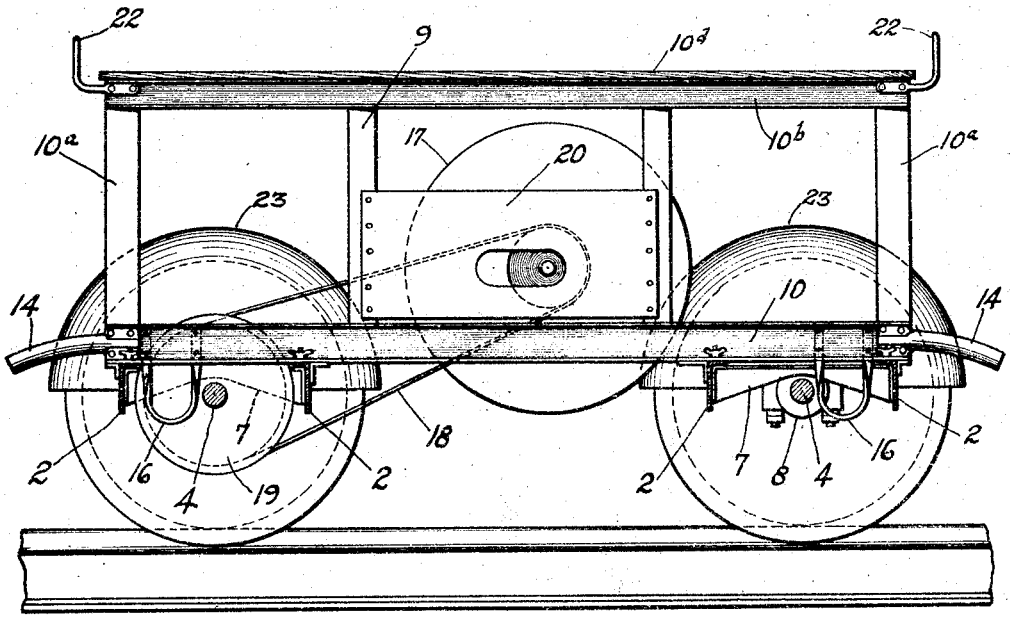
Figure 3:
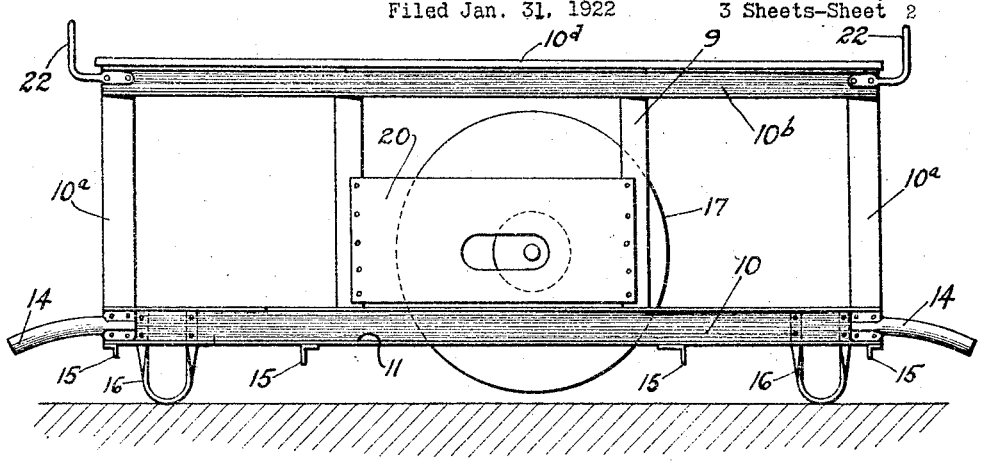
Figure 4:
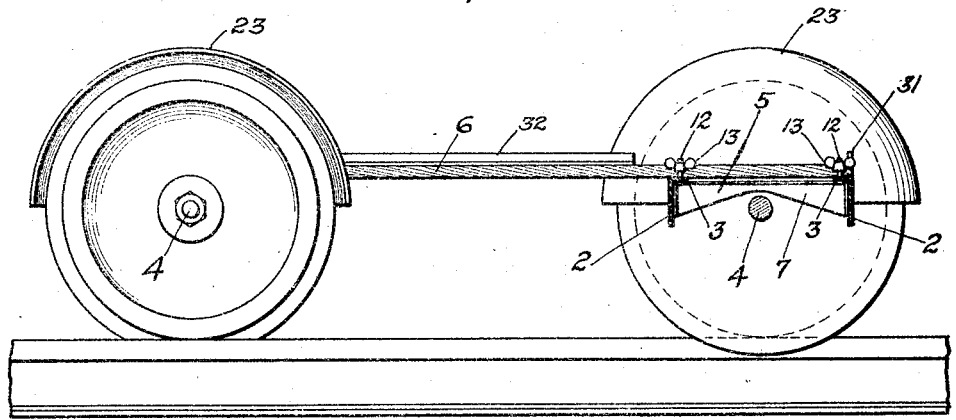
Figure 5:
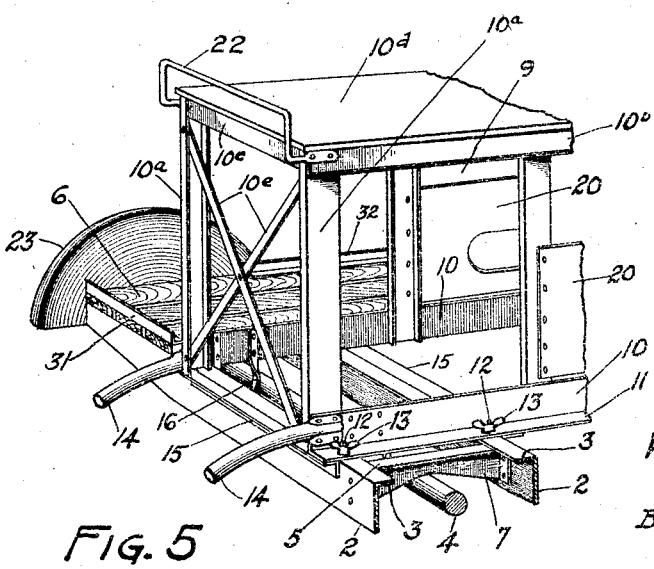

In the accompanying drawings forming part of this specification,

Figure 1 is an end elevation of a railway motor car embodying my invention,

Figure 2 is a side elevation of the same, taken through the line 2—2 of Figure 1, Figure 3 is a side view of the power plant frame removed from the truck frame, Figure 4 is a side view, partially in section, of the truck frame, Figure 5 is a perspective view of a portion of one end of the car, showing the preferred means for mounting the power plant frame thereon, Figure 6 is a plan view of the truck frame with the power plant removed, Figure 7 is a sectional view on the line 7—7 of Figure 6, Figure 8 is a sectional view on the line 8—8 of Figure 6.

In the drawing, the truck frame is shown as composed of cross truss members, preferably metallic bars 2 having horizontal flanges 3 at their upper edges. These members are arranged in pairs at each end of the car on opposite sides of the truck axles 4. Platforms or decks 6 are provided extending lengthwise of the car and preferably of light wooden construction, such as thin oak slats upon which material may be pile or where the men may stand when the car is in use.

Angle bars 31 and 32 are bolted to the slats 6 to prevent articles from falling off the ends and sides thereof.

The middle portion of the truck frame is undecked or left open, suitable braces 7, preferably of sheet metal, being provided between the bars 2 on each side of the opening and between these braces are the bearings 8 of the truck axles. Upon the truck frame I arrange a skeleton power plant frame 9, having longitudinal rails 10 at the bottom, provided with horizontal flanges 11 which are seated on the flanges 3 transversely of the truss bars 2 and lengthwise of the car. Upright standards $10^a$, preferably of channel sheet metal, are bolted to the rails 10 and support rails $10^b$ at their upper ends between which bent sheet metal angles $10^c$ are provided. A light wood top $10^d$ is bolted to the top side rails $10^b$ and $10^c$ and forms a seat for the persons riding on the car. The skeleton frame so provided is preferably braced at each end by cross bars $10^e$ secured at their ends to the adjacent flanges of the uprights $10^a$, as shown in Figure 5. This provides a rigid, substantial power plant frame and at the same time one that is comparatively light and easily lifted onto the truck frame or removed therefrom or loaded in a baggage or other car for shipment from place to place.

Bolts 12 are mounted in the flanges 3 to fit holes in the flanges 11 and wing nuts 13 are provided on these bolts by means of which the rails 10 and the cross truss bars 2 can be rigidly secured together. At the ends of these rails 10 I provide handles 14 for convenience in lifting the power plant frame and removing it from the truck frame. These handles 14 are also used for lifting the complete car on and off the track.

I prefer also to provide angle bars 15 secured to the underside of the rails 10 and extending transversely thereof and engaging the cross bars 2 and serving as guides for seating the power plant frame in its proper position on the cross bars. I prefer also to provide U-shaped legs 16 at each end of the rails 10 adapted to depend between the cross bars 2 when the frames are assembled and serve as a means for supporting the power plant frame when it is removed from the truck.

The engine or motor 17 is mounted in the middle portion of the frame 9 and has a belt drive 18 with a pulley 19 on one of the truck axles. I make no claim in this application to the motive power or the means for transmitting it to the wheels, as any suitable type of internal combustion engine may be successfully used. The frame 9 has suitable guard plates 20 secured to uprights on each side of the motive power. I also provide hand rails 22 at each end of the power plant frame and the top of this frame is preferably closed and forms a seat for the car riders, standing room being provided on the decks or platforms on each side of the power plant frame. Suitable control levers, not shown, project through the seat at the top of the frame 9 within convenient reach of the car driver.

The axle housing is composed of two wheel guards 23 having angle irons 24 bent and riveted thereto, said angle irons being secured by suitable means, such as rivets, to the cross truss bars 2. The axle bearings are bolted to the bottom of the angle irons 24. The front and rear axles of the car project through these bearings and support the railroad wheels, which are adapted to run on the track. An additional brace 26 is provided for the rear axle housing, to which is secured a bearing 27 which serves to steady the drive axle and absorb the belt pull on the drive pulley.

In Figures 7 and 8 I have shown the details of a spring mounting for the car, which consists in providing bolts 33 secured to the angle irons 24 having nuts 34 and washers 35 at their lower ends with axle bearings 8 mounted between said washers and collars 36 on said bolts adjacent said angle irons, suitable chambers 38 being provided in said bearings to receive compression springs 39 mounted on said bolts between the bottom of said chambers and the collars 36. The axles 4 pass through the bearings as described and when a load is applied to the truck frame, vertical movement thereof is permitted, the springs serving as cushions and allowing depression of the frame until the angle irons contact with gaskets 40 which are mounted to encircle the collars 36 and are seated on the top of the auxiliary bearings. These bolts, arranged in pairs, as shown, have the function of permitting vertical movement, but the axles will be held in correct alignment with respect to the frame of the car and the shock or jar resulting from the movement of the car over an uneven track will be eliminated.

I make no claim, of course, to the broad idea of a spring cushion of this kind, but I do claim particularly the compact, light and simple construction and inexpensive application of the spring cushion to a car of this type.

I claim as my invention:

1. The combination, with a truck frame having truck wheels, of a power plant frame mounted lengthwise of said truck frame near the middle portion thereof and readily removable from said truck frame, the top of said power plant frame forming a seat for the car riders and said truck frame having standing room on each side of said power plant frame.

2. A railway motor car comprising a truck frame having track wheels and platforms upon each side adjacent said wheels and spaced apart lengthwise of said truck frame to form a gap between said platforms, a power plant frame fitting within the gap between said platforms and normally secured to said truck frame but separable therefrom to allow said truck frame and said power plant frame to be handled separately.

3. The combination, with a railway car truck frame having track wheels and platforms on each side adjacent said wheels, and a longitudinal gap between said platforms, of a skeleton power plant frame fitting within said gap and having means for securing it to said truck frame, the top of said power plant frame forming a seat for the car riders and said power plant frame and the motor carried thereby being readily separable from said truck frame.

4. A railway motor car comprising a truck frame having cross truss bars with flanged upper edges, of a power plant frame having rails provided with flanges for seating on the flanges of said truss bars, and means for detachably securing them together.

5. The combination, with a railway motor car truck frame having track wheels, and cross truss bars, of a power plant frame seated transversely on said truss bars and having depending guiding members for engaging said truss bars, and means for temporarily locking said power plant frame and said truss bars together.

6. The combination, with a railway motor truck frame having track wheels and cross truss bars having flanged upper edges and studs mounted in said flanged edges, of a power plant frame having flanged rails adapted to be seated transversely on said truss bars and having holes to receive said bolts, and wing nuts for clamping the flanges of said bars and rails together.

7. The combination, with a railway motor car truck frame having track wheels, and cross truss bars, of a power plant frame having side rails seated on said truss bars transversely thereof near the middle portion of said truck frame, said rails having hand grips at the forward and rear ends thereof and means for securing said rails temporarily to said truss bars to allow separation of said power plant frame from said truck frame, and said rails having legs for supporting said power plant frame when removed from said truck frame.

8. A railway motor car comprising a truck frame having track wheels and platforms upon each side adjacent said wheels and spaced apart lengthwise of said truck frame to form a gap between said platforms, a removable frame comprising side rails and uprights secured thereto fitting into the gap between said platforms and having means for securing temporarily said side rails to said truck frame, said removable frame having a light, comparatively thin top forming a seat for riders of the car, and a motor mounted in the lower portion of said removable frame and having a driving connection with said track wheels.

9. A railway motor car comprising cross truss members arranged in pairs, with braces between the members of the same pair, platforms secured to the end portions of said truss members and extending lengthwise of the truck frame, angle bars secured to said truss members, axle bearings having spring cushion mountings on said angle bars, and axles journaled in said bearings and wheels for said axles.

10. A railway motor car comprising a truck frame having cross truss members arranged in pairs, platforms secured to the end portions of said cross truss members and extending lengthwise of the car, angle irons connecting the truss members of the same pair and rigidly secured thereto and to said platforms, axle bearings having cushion supports in said angle irons and axles passing through said bearings and wheels therefor and wheel guards provided between said platforms and the wheels and secured to said angle irons.

11. A railway motor car comprising a truck frame and track wheels therefor, and a power plant frame normally secured to said truck frame but separable therefrom to allow said truck frame and said power plant frame to be handled separately, said truck frame having a standing-room platform and said power plant frame forming a seat for the car riders.

12. A railway motor car comprising a truck frame, and track wheels therefor, and a power plant frame normally secured to said truck frame but separable therefrom to allow said truck frame and said power plant frame to be handled separately, the top of said power plant frame forming a seat for the car riders and the forward and rear portions of said power plant frame having hand-grips thereon.

13. The combination with a railway motor car truck frame having cross members and axles and wheels therefor between said members, of a power plant frame seated transversely on said cross members, and means for temporarily securing said power plant frame and said cross members together.

14. A railway motor car comprising a truck frame having cross members and axles and supporting wheels therefor between said members, platforms supported by the end portions of said cross members and extending lengthwise of the truck frame, and bearings for said axles having spring cushion mountings supported by and between said cross members.

In witness whereof, I have hereunto set my hand this 13" day of January 1922.

WALTER F. KASPER.